May 19, 1931.  E. H. HORSTKOTTE  1,805,486
SYSTEM OF SPEED CONTROL
Filed Jan. 11, 1929
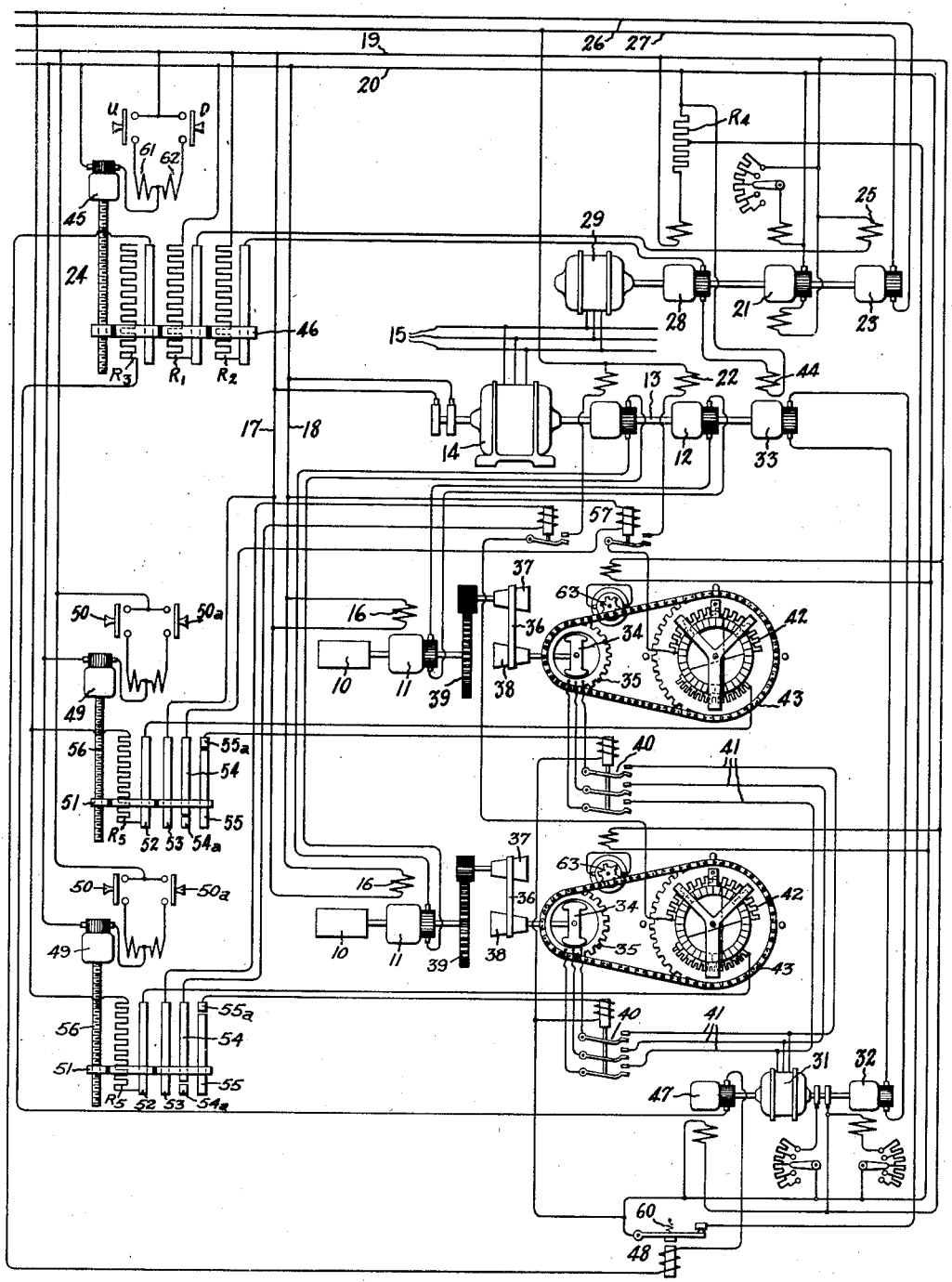
Inventor:
Edward H. Horstkotte,
by Charles E. Tullar
His Attorney Patented May 19, 1931

1,805,486

UNITED STATES PATENT OFFICE

EDWARD H. HORSTKOTTE, OF SCHENECTADY, NEW YORK, ASSIGNOR TO GENERAL ELECTRIC COMPANY, A CORPORATION OF NEW YORK

SYSTEM OF SPEED CONTROL

Application filed January 11, 1929. Serial No. 331,758.

My invention relates to speed controlling systems for electric motors, more particularly to systems wherein a plurality of motors are employed to drive different elements of a driven machine, such as the rolls of a paper making machine or the rolls of a steel mill, and has for its object the provision of an improved multiple motor drive system wherein the speeds of the motors may be varied over a wide range while maintaining predetermined speed relationships between them.

In segregated drives for paper machines, steel mills and the like in which the driven elements of the machines act on a continuous strip of material, it is desirable that the relative speeds between the individual motors for the driven elements be kept substantially constant, so that the material being acted upon will not be stretched, allowed to sag, or be buckled between the various sectional rolls. Also it is desirable that the speeds of all the sectional driven motors should be adjustable as a unit over a wide range of speeds, so that the machine may be run at the speed best suited to the particular material being operated upon. And in addition to the above, it is absolutely necessary for the successful operation of such a segregated drive that each of the sectional driven elements thereof should be so arranged that its speed may be independently varied to adjust the speed relationship between the various sectional elements, and that after the speed of each element has been properly adjusted, the speed relationship between the various sectional elements should be maintained fixed regardless of any changes in the load, or other conditions which tend to disturb the speed at which the driving motor of any individual element tends to run.

In carrying out my invention in one form, I have shown it as applied to a segregated drive for a paper making machine in which each of the several driven elements located at the various sections of the machine is driven by a direct current separately excited shunt motor, the armature of each of which is supplied from an independent generator, and in which the field circuits of the several generators are supplied from a common adjustable source of excitation.

For a better and more complete understanding of my invention, reference should be made to the following specification and to the accompanying drawing, the single figure of which is a diagrammatical representation of an embodiment of the invention.

Referring now to the drawing, each of a plurality of driven elements which I have shown as a plurality of sectional rolls 10 of a paper making machine is arranged to be driven by one of a plurality of independent direct current shunt motors 11. Although but two sections of the machine have been shown in the drawing, it will be understood that as many sections as necessary may be provided. Since the elements comprised in one section of the drive are duplicated in the succeeding sections, like reference numerals have been applied in the drawing to the corresponding elements in each section of the drive.

In the arrangement shown, the armature of each motor 11 is supplied with electrical energy from one of a plurality of independent direct current generators 12. The generators 12 are represented as being mounted on a common shaft 13 and driven at a constant speed by the large main synchronous motor 14 which is supplied from a three phase source of power represented by the three supply lines 15. The direct current field winding of the synchronous motor and the shunt field windings 16 of the sectional motors are supplied with direct current from the supply lines 17, 18 connected with constant excitation buses 19, 20, which are supplied with direct current by the exciter 21, the generated voltage of which may be regulated constant by any suitable voltage regulating device (not shown).

Provision for simultaneously varying the speeds of the sectional drive motors 11 over a wide range while at the same time preserving the ratios existing between the speeds of the driven elements is made in the form of means for simultaneously varying the currents flowing in the field windings 22 of the corresponding sectional supply generators 12, which means comprises the exciter 23 having a resistance section $R_1$ of a motor controlled rheostat 24, connected in the circuit of its separately excited field winding 25. The field winding 25 is supplied with constant excitation from the constant excitation buses 19, 20. The field windings 22 of the sectional supply generators are connected to the variable excitation buses 26, 27, which in turn are supplied from the variable exciter 23. Instead of exciting the generators 12 from the variable exciter 23 and varying the terminal voltage of the generators by varying the excitation of the exciter, I may dispense with the variable exciter 23 and excite the generators 12 from the constant excitation buses 19, 20 and vary the voltage of the generators by means of variable resistors in their field circuits.

The exciters 21 and 23 together with a small counter electromotive force generator 28 (the function of which will be explained later) are mounted on a common shaft as shown, and are driven by a suitable alternating current motor 29 arranged to be supplied from the three phase supply lines 15. Although not shown in the drawing, it will of course be appreciated that I employ suitable switching devices in the supply circuits between the source 15 and the terminals of the motors 14 and 29.

In order to maintain the various driven elements of the paper machine in fixed speed relationship, a small regulating dynamo electric machine is provided at each section of the machine for each of the driven elements for holding the speed for each sectional motor constant at any speed to which it may have been adjusted. These regulating dynamo-electric machines are of the synchronous dynamo-meter type; that is to say they tend to maintain a relative speed of rotation between the rotor and stator members bearing a fixed relationship to the frequency of an alternating current supplied to the stator members by the alternator 31 of a master set, shown in the drawing as a Ward Leonard set comprising the alternator 31 mounted on the same shaft with and driven by the direct current motor 32, which is supplied with direct current by generator 33 mounted on shaft 13 and driven by synchronous motor 14. The regulating dynamo-electric machine provided at each section of the drive comprises a rotor member 34, and a stator member 35. The rotor member 34 is represented as a magnetic structure of fixed polarity and as being driven by the corresponding sectional drive motor 11 by means of the belt 36, cone pulleys 37, 38 and gearing 39 whereby the speed of the rotor 34 is made greater than the speed of the corresponding motor. The belt 36 is arranged to have its position adjusted on the cone pulleys to adjust the speed of each driven element with respect to the speeds of the other elements as desired. The stator member 35 of each regulating dynamo-electric machine is provided with a distributed three phase winding (not shown) which is arranged to be connected by means of a contactor 40 with the alternating current mains 41 which are supplied with alternating current of a frequency dependent upon the speed of the alternator 31 which is driven by the motor 32 at a speed proportional to that at which it is desired to drive the machine as a unit. Each stator member 35 is free to rotate in either direction about the rotor member, and is constructed so as to be balanced in any position to which it may be moved, and is arranged to actuate a suitable regulating means for the corresponding driving motor 11, which regulating means is illustrated as comprising a rheostat 42 arranged to regulate the excitation of the field winding of the corresponding generator 12 and consequently the magnitude of the voltage supplied by the generator 12 to the sectional drive motor 11. The rheostat 42 is arranged to be operated by the stator member 35 by means of gearing and a suitable connecting drive chain 43. In accordance with the invention, the stator member 35 has no normal position to which it is biased in any way, and therefore the rheostat 42 and the stator member 35 will remain in any position to which they may have been moved in response to load variations requiring adjustment of the rheostat to compensate for the same.

In order to stabilize the action of the speed regulators, a small direct current generator 63 separately excited from the constant excitation buses 19, 20 and having a short circuited armature is provided at each section, and suitably arranged to be driven by the stators 35 of the regulting device. If the stator 35 starts rotating rapidly as it does when the regulator becomes unstable, then a relatively large current is circulated through the generator armature which produces a braking action which causes the stator to come to rest very rapidly.

It has previously been pointed out that the speed of the paper machine may be varied as a unit by varying the value of the resistance section $R_1$ in the field circuit of the variable exciter 23 which supplies excitation to the sectional supply generators. When the speed of the machine is raised or lowered as a unit, it will be appreciated that the frequency of the alternating currents supplied by the alternator 31 to the stators 35 of the regulating devices, must be raised or lowered in proportional amount, for otherwise the regulating devices would function to maintain the original speed. Provision therefore for raising or lowering the frequency of the currents delivered by the master alternator 31 to the stators of the regulating devices is made in the form of a variable resistance section $R_2$ connected in the circuit of the field winding 44 of the direct current generator 33 which supplies power to the drive motor 32 for the alternator 31. As shown, a small pilot motor 45 is supplied from the mains 19, 20, and drives the contact arm 46 either in an upwardly or downwardly direction to vary the resistances $R_1$ and $R_2$ simultaneously, as well as the resistance $R_3$ (the function of which will be presently explained). The pilot motor 45 is provided with two oppositely wound field windings 61 and 62 either of which may be excited by depression of the corresponding push button U or D to cause rotation of the motor in the proper direction to move the contact arm 46 upwardly or downwardly as desired.

It will be realized, of course, that if the speed of the drive as a whole is to be maintained constant at any desired point in the speed range to which it may have been adjusted, that the frequency of the alternating currents supplied to the stators 35 of the regulating devices must likewise be kept constant at some corresponding value, for otherwise the speeds of the sectional motors 10 which are regulated with respect to the reference frequency supplied to the regulating devices would vary, thereby causing the speed of the drive as a whole to vary. Accordingly in order to insure constant speed operation of the drive at any point in the speed range, a speed regulator is provided for maintaining the speed of the master set constant at the desired value. This speed regulator comprises a small pilot generator 47 mounted on the same shaft with the master alternator 31 and a sensitive voltage responsive relay 48 of the vibratory type the winding of which is connected in series relationship with the pilot generator 47 and the variable resistance $R_3$ to which reference has previously been made. As the speed of the drive is increased over the speed range by operation of rheostat 24, the speed and the generated voltage of pilot generator 47 is increased in proportion. The resistance section $R_3$, however, is proportionally increased to dissipate the added voltage drop due to the increase in speed of generator 47 and thus maintains a constant voltage drop across the terminals of the coil of relay 48 for all settings of rheostat 24 and thus for all basic speeds of the drive. A resistor $R_4$ is provided in the field circuit of counter electromotive force generator 28, the armature of which is connected in the field circuit of generator 33 which supplies the motor 32 of master set. Thus, for any setting of the rheostat 24 there is a speed for generator 47 that will maintain a constant voltage drop on the coil of relay 48. If for any setting of rheostat 24 the speed of the master set should tend to change, the generator 47 would change the drop across the coil of the vibratory relay 48 which would then function to change the drop across the field of counter electromotive force generator 28 by opening and closing a short circuit about a portion of resistor $R_4$ and consequently the drop across the field of generator 33, the armature voltage of which would then vary to restore the original speed of the master set.

At each section of the drive a suitable starter is provided for starting up the corresponding sectional drive motor 11. As shown, a pilot motor 49 supplied from the mains 19, 20 and controlled for operation in both directions by push buttons 50, 50a drives the movable contact arm 51 over the stationary cooperating contacts 52, 53, 54, 54a, 55, 55a, and the resistance section $R_5$ which is connected in the field circuit of each sectional supply generator 12.

An explanation of the operation of the system will now be given which will include the starting of the sectional drive motors, the adjustment of the speed of each section of the drive to any desired value, the adjustment of the basic speed of the drive as a whole, and the operation of the sectional speed regulators to maintain the speed relationship between sections of the drive at any basic speed to which the drive may be adjusted. The operation for one section only will be explained, the operation being the same for all sections.

Assuming the previous starting of motor 29 and main synchronous motor 14, the exciters 21 and 23 will be impressing voltage on mains 19, 20 and 26, 27 respectively, and the master direct current generator 33 will be supplying the master set which will be turning over at a low speed provided that the arm 46 of rheostat 24 is in its lowermost position. Depression of start button 50 at any section connects the pilot motor 49 with mains 19, 20. The movable contact arm 51 of the starting device which is in its lowermost position is then driven upwardly by threaded shaft 56. As it leaves contact 54a and engages contact 54, contacts 53 and 54 are short circuited establishing circuit from mains 17 and 18, to and through the energizing winding of contactor 57 which then closes its contact and establishes a circuit for the field winding 22 of sectional generator from main 27 through the field winding 22, contactor 57, rheostat 42, contacts 52, 51, resistor $R_5$ to main 26. Voltage is thus applied to the armature of sectional motor 11 and it starts slowly, the speed increasing as contact 51 travels upwardly short circuiting resistor $R_5$ in the generator field circuit. As contact arm 51 reaches its upper limit of travel and engages contact 55a, the winding of solenoid 40 is energized from mains 19 and 20 over a circuit that may readily be traced, and it closes its contacts to apply the reference frequency voltage of alternator 31 to the stator 35 of the sectional speed regulating device and the speed of the motor 11 will be regulated with respect to this reference frequency. All the sectional motors are started in similar manner.

The speed of any sectional drive motor 11 may be adjusted to give any desired speed relationship between the sections of the drive by shifting the belt 36 connecting each motor 11 with the rotor 34 of its speed regulator. The effect of shifting the belt is to cause the speed of rotor 34 to be increased or decreased depending upon the direction of the shift. If it be desired to decrease the speed of motor 11, the belt is shifted to tend to increase the speed of the rotor. Then in accordance with a well known property of synchronous dynamo electric machines, the action will be such that the polarized rotor will attempt to remain in step with the rotating field of the stator, which means that the stator (which is freely movable) will rotate in the direction of rotation of rotor 34 which will be assumed to be clockwise thereby rotating the arms of rheostat 42 inserting resistance in the field of generator 12 which results in a decrease in voltage supplied to motor 11 and consequently in a decrease in its speed. When the speed has been sufficiently reduced to cause rotor 34 to run in exact synchronism with the rotating field of stator 35, the action of the regulator will cease. Thus it will be seen, that the motors of each section may be adjusted to any desired speed by merely shifting the belt 36, the effect of which is to make some other speed of the motor 11 correspond with the synchronous speed of rotor 34. Those who are skilled in the art will readily appreciate that had the belt been shifted in the opposite direction, the operation would have been the opposite of that just described.

Should it be desired to adjust the speed of the drive as a whole, that is to say, to adjust the speed of all the sectional motors 11, simultaneously this may be done by depressing either of the push buttons U or D of the speed changing device 24, depending on whether it is desired to increase or to decrease the speed. Depression of button U serves to connect the pilot motor 45 to the mains 19, 20 through the field winding 61, and to cause it to rotate and drive the contact arm 46 in an upwardly direction gradually short circuiting the resistors $R_1$ and $R_2$ and gradually inserting the resistor $R_3$ in the circuit of the coil of voltage relay 48. Short circuiting of resistor $R_1$, which is connected in the field circuit of exciter 23, which supplies the field circuits of generators 12, increases the field strength thereof and likewise the field strength and the generated voltage of sectional generators 12 in proportion. As a result of this, the voltage applied to the armatures of sectional motors 11 of the drive is increased and the motors speed up to the desired speed. The simultaneous short circuiting of $R_2$ increases the field strength of the master set supply generator 33 and likewise the speed of the master set. Resistor $R_2$ is so designed that movement of contact arm 46 to adjust the speed of the drive changes the field strength of generator 33 just sufficiently to cause the reference frequency supplied by generator 31 of the master set to the stators 35 of the sectional regulators to be of such value that the speed of the rotating fields of stators 35 will correspond exactly with the increased speed of the sectional motors 10, that is to say, the speed of the generator 31 is controlled so that the rotating field of stators 35 and of rotors 34 of the regulators will be in exact synchronism for all basic speeds to which the drive may be adjusted.

Those skilled in the art will appreciate that the control just described makes possible a wide range of speed values for the drive without affecting the excitation of the driving motors in the slightest degree. In fact, full field may be maintained for all speeds of the drive thus assuring maximum torque at every speed to which the drive may be adjusted.

If the speed of a sectional motor 11 should tend to vary from the desired speed to which it has been adjusted and thus tend to disturb the speed relationship between the sections, the corresponding regulator would function to maintain the speed constant. For example, assume that the load on sectional motor 11 is suddenly increased, tending to slow the motor. The rotor 34 of the regulating device would also tend to slow down, and in accordance with a well known property of synchronous machines, the freely movable stator member would rotate in a direction counter to the rotation of rotor 34 to maintain the synchronous relation therebetween. Assuming, a clockwise rotation of rotor 34, the direction of rotation of stator 35 would be counter clockwise and would vary the rheostat 42 to increase the field strength of generator 12 and thereby increase its generated voltage and the speed of the motor 11. When the speed of the motor has increased to the proper amount, the rotor 34 will no longer tend to run below the synchronous speed of the rotating field of the stator and the action of the regulator will cease. Had the speed of motor 11 tended to increase, the action of the regulator would have been the opposite of that above described as will be understood by those skilled in the art.

The operation of vibratory voltage relay 48 to maintain constant speed of the master set and therefore constant speed of the drive at any value to which it may be adjusted, is as follows: When the setting of arm 46 is changed to adjust the speed of the drive, say to increase it, the speed of the master set increases proportionately, and this increase in speed results in an increase in voltage generated by pilot generator 47, which increase is dissipated in the resistance $R_3$ which is increased by the new setting of the arm 46, thereby maintaining a constant drop at the terminals of the coil of relay 48. But should the speed of the master set increase for some reason without the setting of arm 46 having been changed, the increase in the voltage generated by pilot generator 47 would not be dissipated, but would be added to the drop of the coil of relay 48 which would cause the relay to open its contacts thereby opening a short circuit about a portion of the resistor $R_4$ in the field circuit of counter electromotive force generator 28.

The counter electromotive force generator being connected in the field circuit of generator 33 which supplies energy to the master set, this decrease in its excitation would be reflected in a correspondingly decreased speed of the master set. When the speed of the master set regains its former value, the voltage drop across the coil of relay 48 will again be normal, and will allow the spring 60 to reclose its contacts.

While I have described my invention as embodied in concrete form and operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. In a segregated paper machine drive, a plurality of motors and a corresponding separate supply generator for each of said motors, means for simultaneously varying the voltages supplied to each of said motors to vary their speeds simultaneously over a range of predetermined values so as to maintain predetermined ratios therebetween comprising a common source of excitation for said generators and means for varying said source to vary the excitation of said generators, and means responsive to variations in the speeds of the motors for varying the excitation of said generators to maintain the speeds of said motors constant at any one of said predetermined values.

2. A system for controlling the speed of electric motors, wherein a plurality of motors are arranged to be operated at different speeds having constant but adjustable ratios, a plurality of electric motors each arranged to be operated over a range of predetermined speed values, an independent generator for supplying each of said motors, a common source of excitation for the fields of the generators, means for varying the excitation of said generators to vary the speeds of all the motors as a unit so as to maintain said constant ratios therebetween, and means for maintaining the speed ratios between each motor and all the other motors constant comprising a speed regulator of the dynamometer type actuated in accordance with the variations of the source of excitation and the speed of the motor for controlling the voltage supplied to the motor.

3. In an electric drive of the class described, wherein a plurality of elements are required to run in fixed speed relationship, and wherein a plurality of separate motors are arranged to drive respectively each of said plurality of elements, a plurality of separate generators arranged to supply respectively each of said motors, a separate variable resistance connected in the field circuit of each of said generators, means for controlling said resistance to maintain the speed relationship of the motors fixed, comprising a member driven by the corresponding motor, and a cooperating freely movable member, one of said members being arranged to provide magnetic poles of a fixed polarity, and the other member being provided with a winding connected to an alternating current source, means for varying the speed of all the motors simultaneously comprising a variable source of excitation for the fields of said generators, and means for varying said source, and means for varying the frequency of said alternating current source in accordance with the variations of said variable source of excitation.

4. A speed controlling system for an electric drive wherein a plurality of motors are required to run in fixed speed relationship comprising in combination, a plurality of electric motors, an independent generator for supplying each motor, a constant source of excitation for the fields of said motors, a variable source of excitation for the fields of said generators, means for controlling the speed of each of said motors comprising a resistance member in the field circuit of the corresponding supply generator, a speed regulator of the synchronous dynamometer type for controlling said resistance, and a master set comprising a master generator excited in proportion to the voltage of said variable source of excitation and a master motor generator set supplied thereby for supplying a reference frequency to one member of the speed regulator, and means for simultaneously varying the speeds of all of said motors comprising means for varying said variable source of excitation.

5. In a motor control system, a plurality of direct current motors for driving the respective sections of a sectionalized load, a separate source of constant excitation for said motors, a separate generator for supplying each of said motors, a source of excitation for said generators and means for varying said source to vary the speed of all of said motors as a unit, a source of alternating current, means for varying the frequency of said alternating current source in accordance with the variation of said variable source of excitation, a separate variable resistance connected in the field circuit of each of said generators, and means including a separate synchronous dynamo electric machine associated with each of said motors and actuated in accordance with the variation in speed of its associated motor and the frequency of said alternating current source for varying said resistances to maintain constant speed ratios between said motors.

In witness whereof, I have hereunto set my hand this 10th day of January, 1929.

EDWARD H. HORSTKOTTE.